(12) United States Patent
Yartsev

(10) Patent No.: US 12,181,615 B2
(45) Date of Patent: Dec. 31, 2024

(54) TEMPORALLY AND SPECTRALLY ADAPTIVE SONAR FOR AUTONOMOUS VEHICLE NAVIGATION

(71) Applicant: The Regents of the University of California, Oakland, CA (US)

(72) Inventor: Michael Moshe Yartsev, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 7 days.

(21) Appl. No.: 18/043,921

(22) PCT Filed: Sep. 2, 2021

(86) PCT No.: PCT/US2021/071359
§ 371 (c)(1),
(2) Date: Mar. 3, 2023

(87) PCT Pub. No.: WO2022/051767
PCT Pub. Date: Mar. 10, 2022

(65) Prior Publication Data
US 2023/0324529 A1    Oct. 12, 2023

Related U.S. Application Data

(60) Provisional application No. 63/074,449, filed on Sep. 3, 2020.

(51) Int. Cl.
G01S 7/52    (2006.01)
G01S 15/93   (2020.01)

(52) U.S. Cl.
CPC .......... *G01S 7/52004* (2013.01); *G01S 15/93* (2013.01)

(58) Field of Classification Search
CPC ....... G01S 7/52004; G01S 15/93; G01S 15/42
See application file for complete search history.

(56) References Cited

U.S. PATENT DOCUMENTS

| 10,558,224 | B1 * | 2/2020 | Lin ...................... G05D 1/0285 |
| 2014/0067186 | A1 | 3/2014 | Wethern |
| 2015/0268341 | A1 | 9/2015 | Kyrtsos |
| 2018/0032040 | A1 | 2/2018 | Sweet, III et al. |
| 2020/0225346 | A1 | 7/2020 | Suzuki et al. |
| 2022/0075061 | A1 * | 3/2022 | Husain .................. G06N 20/00 |

FOREIGN PATENT DOCUMENTS

| WO | 2016094849 A1 | 6/2016 |
| WO | 2019094843 A1 | 5/2019 |

OTHER PUBLICATIONS

International Search Report and Written Opinion for PCT/US21/71359; Dec. 13, 2021, 8 pages.

\* cited by examiner

*Primary Examiner* — John A Tweel, Jr.

(57) ABSTRACT

In one example, a method performed by a processing system of an autonomous vehicle includes controlling a sonar system of the autonomous vehicle to emit a plurality of sonar beams into an environment surrounding the autonomous vehicle, detecting a change in conditions in the environment, and adjusting, in response to the change in conditions, at least one of: a temporal parameter of the plurality of sonar beams or a spectral parameter of the plurality of sonar beams.

19 Claims, 4 Drawing Sheets

TEMPORALLY AND SPECTRALLY ADAPTIVE SONAR FOR AUTONOMOUS VEHICLE NAVIGATION

CROSS REFERENCE TO RELATED APPLICATIONS

This application is a 371 U.S. National Phase Application of International Application No. PCT/US2021/071359, filed on Sep. 2, 2021, which claims the benefit of U.S. Provisional Patent Application Ser. No. 63/074,449, filed on Sep. 3, 2020, both of which are herein incorporated by reference in their entirety.

FIELD OF THE DISCLOSURE

The present invention generally relates to autonomous vehicles, and more specifically relates to sonar systems for providing navigation for autonomous vehicles.

BACKGROUND

The field of autonomous transportation is rapidly evolving to operate in diverse settings and conditions. For instance, cars that can automate certain driver tasks (such as parking) are entering the mainstream, and many automobile manufacturers are actively developing technology to support fully autonomous cars (i.e., cars that are capable of operating without human control). Autonomous vehicles may take other forms as well, such as drones and robots moving on the ground or in the sky.

SUMMARY OF THE DISCLOSURE

In one example, a method performed by a processing system of an autonomous vehicle includes controlling a sonar system of the autonomous vehicle to emit a plurality of sonar beams into an environment surrounding the autonomous vehicle, detecting a change in conditions in the environment, and adjusting, in response to the change in conditions, at least one of: a temporal parameter of the plurality of sonar beams or a spectral parameter of the plurality of sonar beams.

In another example, a method performed by a processing system of an autonomous vehicle includes controlling a sonar system of the autonomous vehicle to emit a plurality of sonar beams into an environment surrounding the autonomous vehicle, detecting a change in an internal condition of the autonomous vehicle, and adjusting, in response to the change in the internal condition, at least one of: a temporal parameter of the plurality of sonar beams or a spectral parameter of the plurality of sonar beams.

In another example, a non-transitory computer-readable medium stores instructions which, when executed by a processing system of an autonomous vehicle, cause the processing system to perform operations. The operations include controlling a sonar system of the autonomous vehicle to emit a plurality of sonar beams into an environment surrounding the autonomous vehicle, detecting a change in at least one of: conditions in the environment or an operating parameter of the autonomous vehicle, and adjusting, in response to the change, at least one of: a temporal parameter of the plurality of sonar beams or a spectral parameter of the plurality of sonar beams.

BRIEF DESCRIPTION OF THE DRAWINGS

The teachings of the present disclosure can be readily understood by considering the following detailed description in conjunction with the accompanying drawings, in which.

DETAILED DESCRIPTION

Figure 1:
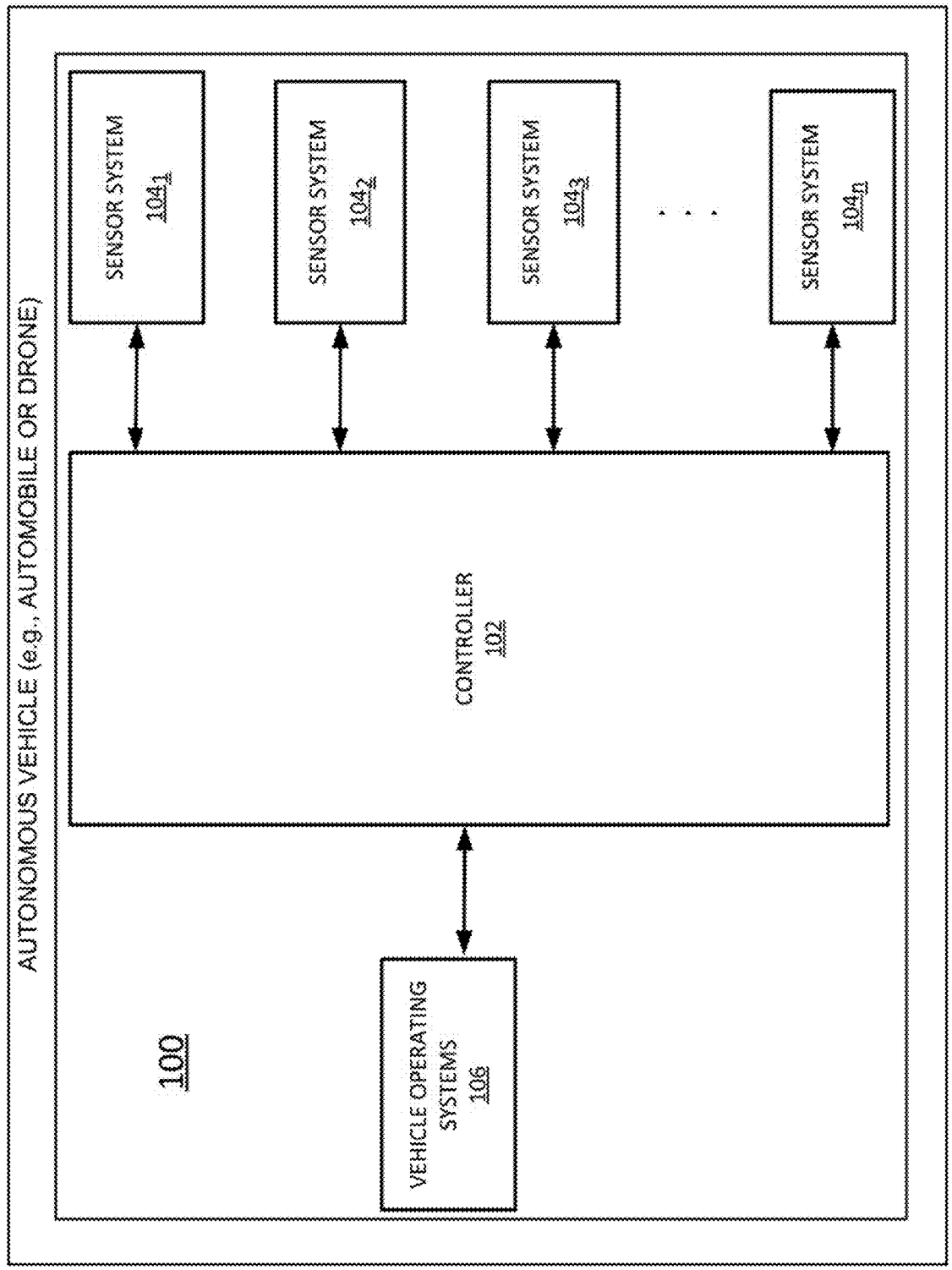
FIG. 1 is a block diagram illustrating one example of a system for operating an autonomous vehicle.

In one example, the present disclosure provides temporally and spectrally adaptive sonar systems for the navigation and control of autonomous vehicles such as self-driving cars, drones, and/or other types of autonomous vehicles. As discussed above, the field of autonomous transportation is rapidly evolving to operate in diverse settings and conditions. Critical to the performance of an autonomous vehicle is the ability to detect other objects in the autonomous vehicle's vicinity, e.g., so that collisions between the autonomous vehicle and the other objects (including static objects, structures, humans, animals, other autonomous vehicles, and non-autonomous vehicles) can be avoided.

For instance, many autonomous vehicles utilize a plurality of different types of sensor systems to detect other objects, including sound navigation ranging (sonar) systems, light detection and ranging (lidar) systems, radar systems, and camera (e.g., RGB and/or infrared video camera) systems. These sensor systems collect data from the environment surrounding the autonomous vehicle, and the data may be analyzed by a processor of the autonomous vehicle in order to detect the presence and location of other objects. The processor may then adjust one or more operating parameters of the autonomous vehicle (e.g., speed, steering, and/or other parameters) in order to minimize the possibility of collision with the detected objects.

Although these sensor systems have been shown to improve the safety of autonomous vehicles by reducing collisions, the sensor systems tend to be computationally inefficient. For instance, the sensor systems may generate large volumes of data that must be processed quickly (e.g., in real or near-real time). The performance of excessive computations may delay the identification and deployment of necessary resources and actions. For instance, if the processor is unable to process the volume of data quickly enough, the processor may be unable to detect another object in time to avoid a collision. More powerful processors may be capable of processing the large volumes of data in an efficient manner, but these more powerful processors may be cost prohibitive for the average consumer.

Examples of the present disclosure focus in particular on sonar systems that are used for autonomous vehicle navigation. In one particular example, the temporal and/or spectral parameters of the sonar beams emitted by a sonar system may be dynamically adjusted to adapt to detected conditions in the environment surrounding an autonomous vehicle (e.g., vehicle traffic density, weather, geographic location, etc.) and/or to the detected operating parameters of the autonomous vehicle (e.g., vehicle speed, available processing power, available memory, etc.). In one example, the temporal parameters of the sonar beams may include sampling rate (i.e., the number of sonar beams emitted within a fixed window of time). The spectral parameters may include, in one example, whether sonar beams emitted by the sonar system are of a constant spectral frequency or are frequency modulated, which may provide different spatial resolutions for measuring distance, object structure, movement, and other information.

For instance, when vehicle traffic density in the surrounding environment is light, the sampling rate of the sonar system may be reduced to conserve computational power. However, if the vehicle traffic density increases, then the sampling rate of the sonar system may be increased in response. In this way, the sonar system may assist to safely navigate the autonomous vehicle, while making efficient use of computational resources. These and other aspects of the disclosure are discussed in greater detail below in connection with the examples of FIGS. 1-3.

To aid in understanding of the present disclosure, FIG. 1 is a block diagram illustrating one example of a system 100 for operating an autonomous vehicle. As illustrated, the system 100 generally comprises a controller 102 communicatively coupled to a plurality of sensor systems $104_1$-$104_n$ (hereinafter individually referred to as a "sensor system 104" or collectively referred to as "sensor systems 104") and to vehicle operating systems 106.

The controller 102 may comprise one or more hardware processor elements, such as a central processing unit (CPU), a microprocessor, a multi-core processor, or the like. In one example, the controller 102 may be configured in a manner similar to the computing system 400 illustrated in FIG. 4 and described below. The controller 102 may be configured to process data collected by the sensor systems 104 and to adjust the vehicle operating systems 106 in response to the processed data, as described in further detail below. The controller 102 may be further configured to adjust the operations of one or more of the sensor systems 104 in response to the processed data in order to adjust the manner (e.g., frequency, type, etc.) in which data is collected, as also described in further detail below.

The sensor systems 104 may comprise a plurality of different types of sensor systems that are configured to collect data from an environment surrounding the autonomous vehicle and to send the collected data to the controller 102 for processing. For instance, the sensor system $104_1$ may comprise a sonar system, the sensor system $104_2$ may comprise a lidar system, the sensor system $104_3$ may comprise a radar system, and the sensor system $104_n$ may comprise a camera system (e.g., an RGB and/or infrared camera system). In one example, the sensor systems 104 include at least a sonar system. Although four sensor systems 104 are illustrated in FIG. 1, any number of sensor systems 104 may be deployed as part of the system 100. Moreover, the sensor systems 104 may include types of sensor systems other than sonar, lidar, radar, and camera systems.

The vehicle operating systems 106 may comprise one or more vehicle systems that cooperate to operate the autonomous vehicle in an autonomous and/or automated manner. For instance, the vehicle operating systems 106 may include systems to control vehicle speed (e.g., acceleration and/or braking), direction (e.g., steering), visibility (e.g., windshield wipers, headlights, defroster, etc.), fuel source (e.g., for hybrid systems that may be operable using two or more fuel sources), temperature (e.g., heating and cooling), navigation (e.g., global positioning systems), and or other systems. In one example, the vehicle operating systems 106 may send signals to the controller 102 to allow the controller 102 to monitor the current conditions of the vehicle operating systems 106 (e.g., the current speed and/or direction of travel of the autonomous vehicle, the current internal temperature of the autonomous vehicle, the current location of the autonomous vehicle, etc.). In a further example, the controller 102 may send signals to one or more of the vehicle operating systems 106 to control the conditions of the vehicle operating systems.

In an example of operation, the sensor systems 104 may collect data from the environment surrounding the autonomous vehicle. As discussed above, the data may include sonar data, lidar data, radar data, images, and/or other data. In one example, the collected data includes at least sonar data. The sonar data may comprise, for instance, information about how long it takes a sonar beam (e.g., a sound wave or pulse) emitted by a sonar system of the system 100 to return. For instance, the sonar beam may be emitted by the sonar system, bounce off another object in the environment surrounding the autonomous vehicle (such as another vehicle, a building, a bridge or overpass, a traffic signal, etc.), and return to the sonar system.

The controller 102 may process the data collected by the sensor systems 104 in order to detect objects in the environment surrounding the autonomous vehicle. For instance, the time taken by the sonar beam to make the round trip (e.g., from emission by the sonar system, to bouncing off the other object, to receipt by the sonar system) may be analyzed by the controller 102 in order to estimate the distance from the autonomous vehicle to the other object. The direction of emission of the sonar beam may be analyzed by the controller 102 in order to estimate the position of the other object (e.g., whether the other object is in front of the autonomous vehicle, to the left or right of the autonomous vehicle, etc.). Methods for detecting object position and distance based on sonar are well known to those of skill in the art.

Based on the detected objects, the controller 102 may send a signal to one or more of the vehicle operating systems 106 to adjust an operation of the autonomous vehicle. For instance, the controller 102 may determine, based on the autonomous vehicle's current speed and direction of travel that the autonomous vehicle is likely to collide with another vehicle that is in front of the autonomous vehicle and is detected to be slowing down. The controller 102 may send a signal to the autonomous vehicle's braking system to decrease a speed of the autonomous vehicle in order to avoid collision. Alternatively, the controller 102 may send a signal to the steering system of the autonomous vehicle to steer the autonomous vehicle into a different travel lane.

In further examples, the controller 102 may send a signal to one or more of the sensor systems 104, where the signal is sent based on the detected objects and adjusts a collection of data by the one or more sensor systems 104. For instance, the controller 102 may detect, based on analysis of the data collected by the sensor systems 104, that the density of vehicle traffic in the environment surrounding the autonomous vehicle is increasing. In response, the controller 102 may send a signal to a sonar system of the autonomous vehicle to increase a sampling rate of the sonar system (e.g., a number of sonar beams emitted by the sonar system within a fixed window of time). For instance, the signal may instruct the sonar system to emit a sonar beam every four seconds as opposed to every eight seconds. Alternatively, the controller 102 may detect, based on analysis of the data collected by the sensor systems 104, that the density of vehicle traffic in the environment surrounding the autonomous vehicle is decreasing. In response, the controller 102 may send a signal to a sonar system of the autonomous vehicle to decrease the sampling rate of the sonar system. For instance, the signal may instruct the sonar system to emit a sonar beam every eight seconds as opposed to every six seconds.

In further examples, rather than adjusting a temporal parameter (e.g., the sampling rate) of the sonar system, the controller 102 may send a signal to adjust a spectral parameter of the sonar system. For instance, the signal may instruct the sonar system to emit constant spectral frequency sonar beams as opposed to frequency modulated sonar beams, or vice versa, in order to adjust the spatial resolution of the data collected by the sonar system. For instance, a constant frequency sonar beam can be used to estimate the motion of objects (such as pedestrians and bicyclists) in the surrounding environment using Doppler shift. On the other hand, a frequency modulated sonar beam can be used to better characterize the textures of objects in the surrounding environment to allow better discrimination between objects (e.g., to distinguish between an individual walking and an individual riding a bicycle). The controller 102 may alternate between constant frequency and frequency modulated sonar beams dynamically. For instance, alternating or interfacing a frequency modulated sonar beam with a constant frequency sonar beam may provide the benefits of both types of sonar beams under some conditions.

Since the conditions of (e.g., number and locations of other objects that are present in) the environment surrounding the autonomous vehicle may change dramatically, even within a single drive, being able to dynamically adjust the collection of data from the environment responsive to these conditions may allow for more efficient use of the autonomous vehicle's computing resources. For instance, an autonomous vehicle may begin driving in relatively light vehicle traffic on the Upper West Side of Manhattan. In this case, a relatively low sampling rate for the sonar system (which results in a smaller volume of data collection by the sonar system, and, thus less data for processing by the controller 102) may be appropriate. For instance, the controller 102 may instruct the sonar system to emit a sonar beam every four seconds. However, as the autonomous vehicle travels south, heavier vehicle traffic density may be encountered. For instance, as the autonomous vehicle enters the Times Square area, traffic may be stop-and-go, and there may be numerous pedestrians and bicyclists weaving through vehicles. In this case, the controller 102 may instruct the sonar system to increase the sampling rate. For instance, the controller 102 may instruct the sonar system to emit a sonar beam every two seconds. Thus, the volume of data collected by the sonar system (and, thus, the amount of data for processing by the controller 102) may now be greater.

The controller 102 may also adjust the temporal and/or spectral parameters of the sonar system in response to other conditions of the surrounding environment, such as weather conditions (e.g., when visibility is impaired, increase the sampling rate), geographic position (e.g., when travelling on a straight, empty road in an unpopulated location, decrease the sampling rate), and/or other conditions. In further examples, the controller 102 may adjust the temporal and/or spectral parameters of the sonar system in response to internal conditions of the autonomous vehicle (e.g., a speed at which the passenger wishes to travel, available processing, memory, and/or other computing resources, etc.). For instance, if the passenger wishes to increase the speed of the autonomous vehicle, the sampling rate of the sonar system may be increased. Alternatively, if the current processing load on the controller 102 exceeds a predefined threshold processing load, the sampling rate of the sonar system may be decreased.

Figure 2:
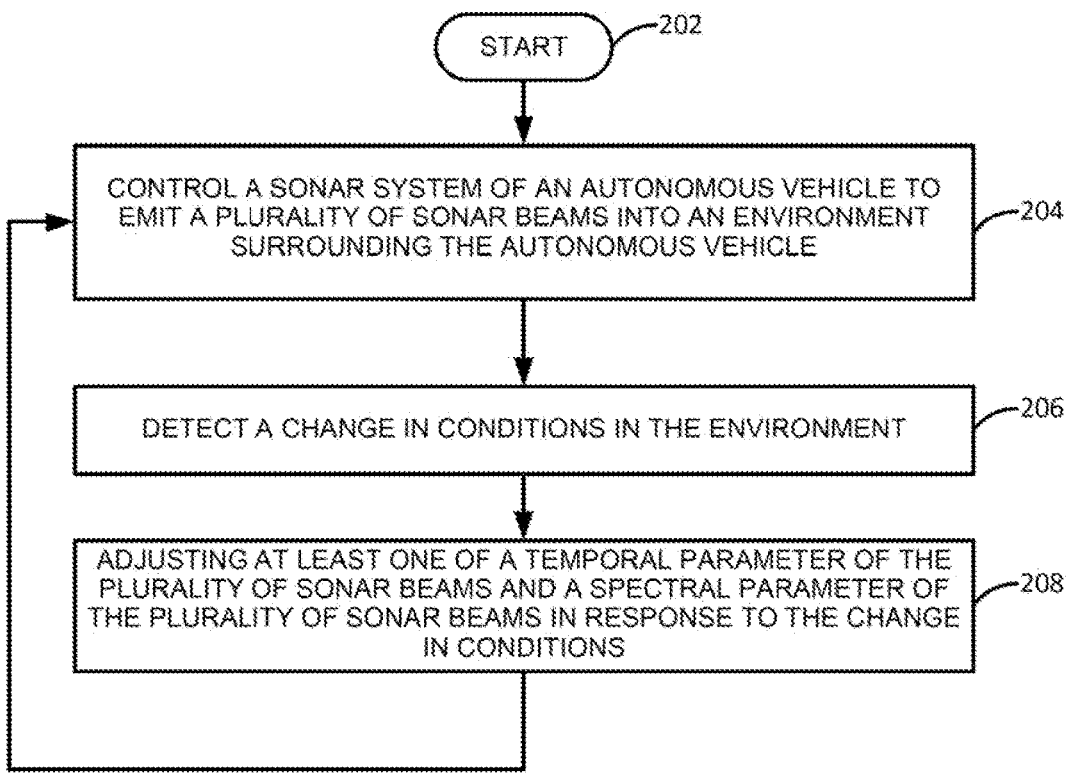
FIG. 2 is a flow diagram illustrating one example of a method for controlling an autonomous vehicle, according to the present disclosure.

FIG. 2 is a flow diagram illustrating one example of a method 200 for controlling an autonomous vehicle, according to the present disclosure. The method 200 may be performed, for instance, by the controller 102 of FIG. 1, described above. Alternatively or in addition, the method 200 may be performed by a computing system, such as the computing system 400 illustrated in FIG. 4 and described in greater detail below. For the sake of example, the method 200 is described as being performed by a processing system.

The method 200 may begin in step 202. In step 204, the processing system may control a sonar system of an autonomous vehicle to emit a plurality of sonar beams into an environment surrounding the autonomous vehicle. In one example, the plurality of sonar beams may be characterized by at least a temporal parameter and a spectral parameter. The temporal parameter may comprise a sampling rate of the plurality of sonar beams (e.g., how may sonar beams are emitted within a fixed window of time, such as one beam every x seconds). The spectral parameter may comprise whether a spectral frequency of the plurality of sonar beams is constant or modulated. Thus, in step 204, the plurality of sonar beams may be emitted according to a first sampling rate and a first frequency type.

In step 206, the processing system may detect a change in conditions in the environment surrounding the autonomous vehicle. For instance, as discussed above, the autonomous vehicle may include a plurality of sensor systems, including the sonar system, which collect data from the environment surrounding the autonomous vehicle and provide the data to the processing system for further analysis. The processing system may process the data in order to detect other objects in the environment surrounding the autonomous vehicle, weather conditions in the environment surrounding the autonomous vehicle, and the like. For instance, based on the processed data, the processing system may determine that vehicle traffic density in the environment surrounding the autonomous vehicle is heavy (e.g., lots of other moving objects detected) or light (e.g., few other moving objects detected). The processing system may also be able to determine, based on the processed data, that it is raining in the environment surrounding the autonomous vehicle, that the roads in the environment surrounding the autonomous vehicle are icy, or the like. By continuously processing the collected data (e.g., in real time), the processing system may be able to detect when there is a change in the conditions that is greater than a predefined threshold (e.g., traffic density increases or decreases by at least x percent, outside temperature has dropped below the freezing point, etc.). Alternatively, by continuously processing the collected data, the processing system may be able to detect when the weather conditions in the environment change (e.g., rain starts or stops or becomes heavier).

In step 208, the processing system may adjust at least one of a temporal parameter of the plurality of sonar beams and a spectral parameter of the plurality of sonar beams in response to the change in conditions. In other words, the processing system may adjust the temporal parameter, the spectral parameter, or both the temporal parameter and the spectral parameter. For instance, as discussed above, the plurality of sonar beams may be emitted by the sonar system according to a first sampling rate and a first frequency type in step 204. In step 208, the processing system may send a signal to the sonar system to emit the plurality of sonar beams according to a second sampling rate and/or a second frequency type. For instance, if an increase in vehicle traffic density is detected in step 206, then the second sampling rate may be greater than the first sampling rate.

The method 200 may then return to step 204, and the processing system may continue to control the sonar system of the autonomous vehicle to emit the plurality of sonar beams into an environment surrounding the autonomous vehicle, now including the adjustment to the temporal and/or spectral parameters of the plurality of sonar beams. The method 200 may continue as described above to continuously detect the conditions in the environment surrounding the autonomous vehicle and to adjust the temporal and/or spectral parameters of the sonar system in an adaptive manner, i.e., responsive to the changing conditions. The method 200 may continue to iterate through steps 204-208 until the processing systems receives a signal to stop (e.g., the engine of the autonomous vehicle shuts off, the passenger of the autonomous vehicle switches the autonomous vehicle to a human-operated or non-autonomous driving mode, etc.).

Figure 3:
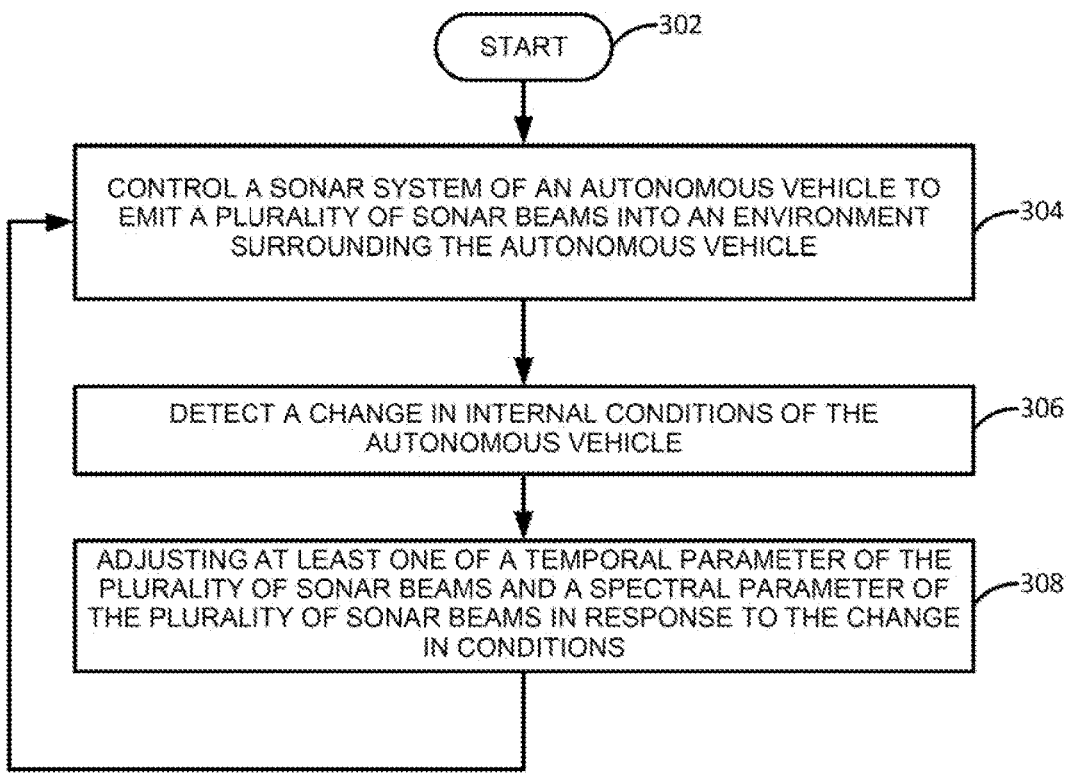
FIG. 3 is a flow diagram illustrating another example of a method for controlling an autonomous vehicle, according to the present disclosure.

As discussed above, the temporal and/or spectral parameters of the sonar system of the autonomous vehicle may also be dynamically adjusted in response to conditions other than external environmental conditions. FIG. 3, for instance, is a flow diagram illustrating another example of a method 300 for controlling an autonomous vehicle, according to the present disclosure. The method 300 may be performed, for instance, by the controller 102 of FIG. 1, described above. Alternatively or in addition, the method 300 may be performed by a computing system, such as the computing system 400 illustrated in FIG. 4 and described in greater detail below. For the sake of example, the method 300 is described as being performed by a processing system.

The method 300 may begin in step 302. In step 304, the processing system may control a sonar system of an autonomous vehicle to emit a plurality of sonar beams into an environment surrounding the autonomous vehicle. In one example, the plurality of sonar beams may be characterized by at least a temporal parameter and a spectral parameter. The temporal parameter may comprise a sampling rate of the plurality of sonar beams (e.g., how may sonar beams are emitted within a fixed window of time, such as one beam every x seconds). The spectral parameter may comprise whether a spectral frequency of the plurality of sonar beams is constant or modulated. Thus, in step 304, the plurality of sonar beams may be emitted according to a first sampling rate and a first frequency type.

In step 306, the processing system may detect a change in the internal conditions of the autonomous vehicle. In one example, the internal conditions of the autonomous vehicle comprise conditions other than the external conditions of the environment surrounding the autonomous vehicle. For instance, the internal conditions of the autonomous vehicle may include at least the status of computing resources of the autonomous vehicle and the status of operating parameters of the autonomous vehicle.

Computing resources may include, for example, processing resources, memory resources, sensor system and/or other data gathering resources, and the like. Operating parameters may include, for example, parameters that control systems of the autonomous vehicle while in operation, such as speed, steering, vehicle interior temperature, and/or other parameters. For instance, as discussed above, the autonomous vehicle may include one or more vehicle operating systems that cooperate to operate the autonomous vehicle in an autonomous and/or automated manner. For instance, the vehicle operating systems may include systems to control vehicle speed (e.g., acceleration and/or braking), direction (e.g., steering), visibility (e.g., windshield wipers, headlights, defroster, etc.), fuel source (e.g., for hybrid systems that may be operable using two or more fuel sources), temperature (e.g., heating and cooling), navigation (e.g., global positioning systems), and or other systems.

The processing system may process data provided by the computing resources and vehicle operating systems in order to detect the statuses of the computing resources and vehicle operating systems. For instance, based on the processed data, the processing system may determine a current consumption level of the autonomous vehicle's processing resources, a current amount of fuel available to the autonomous vehicle, a current speed of travel of the autonomous vehicle, and the like. By continuously processing the collected data (e.g., in real time), the processing system may be able to detect when there is a change in the internal conditions of the autonomous vehicle that is greater than a predefined threshold (e.g., vehicle speed of travel increases or decreases by at least x percent, processing resource consumption has exceeded a predefined upper limit, etc.). Alternatively, by continuously processing the collected data, the processing system may be able to detect when the current internal conditions of the autonomous vehicle are incompatible with a detected change in the environment surrounding the autonomous vehicle (e.g., if the autonomous vehicle continues to travel at its current speed and in its current direction, it will collide with a newly detected obstruction in the road) or when the current internal conditions are otherwise incompatible with safe operation of the autonomous vehicle (e.g., if consumption of the processing resources is not reduced, the processing resources will not be able to process data from the vehicle sensor systems in a timely manner).

In step 208, the processing system may adjust at least one of a temporal parameter of the plurality of sonar beams and a spectral parameter of the plurality of sonar beams in response to the change in the internal conditions of the autonomous vehicle. In other words, the processing system may adjust the temporal parameter, the spectral parameter, or both the temporal parameter and the spectral parameter. For instance, as discussed above, the plurality of sonar beams may be emitted by the sonar system according to a first sampling rate and a first frequency type in step 204. In step 208, the processing system may send a signal to the sonar system to emit the plurality of sonar beams according to a second sampling rate and/or a second frequency type. For instance, if consumption of processing resources beyond a predefined upper limit is detected in step 206, then the second sampling rate may be lower than the first sampling rate.

The method 300 may then return to step 304, and the processing system may continue to control the sonar system of the autonomous vehicle to emit the plurality of sonar beams into an environment surrounding the autonomous vehicle, now including the adjustment to the temporal and/or spectral parameters of the plurality of sonar beams. The method 300 may continue as described above to continuously monitor the internal conditions of the autonomous vehicle and to adjust the temporal and/or spectral parameters of the sonar system in an adaptive manner, i.e., responsive to the changing conditions. The method 300 may continue to iterate through steps 304-308 until the processing systems receives a signal to stop (e.g., the engine of the autonomous vehicle shuts off, the passenger of the autonomous vehicle switches the autonomous vehicle to a human-operated or non-autonomous driving mode, etc.).

Although not specifically specified, one or more steps, functions or operations of the method 200 or 300 may include a storing, displaying and/or outputting step as required for a particular application. In other words, any data, records, fields, and/or intermediate results discussed in the method 200 or 300 can be stored, displayed and/or outputted either on the device executing the method 200 or 300, or to another device, as required for a particular application. Furthermore, steps, blocks, functions, or operations in FIG. 2 and FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 or 300 may comprise optional steps, or can be combined, separated, and/or performed in a different order from that described.

Figure 4:
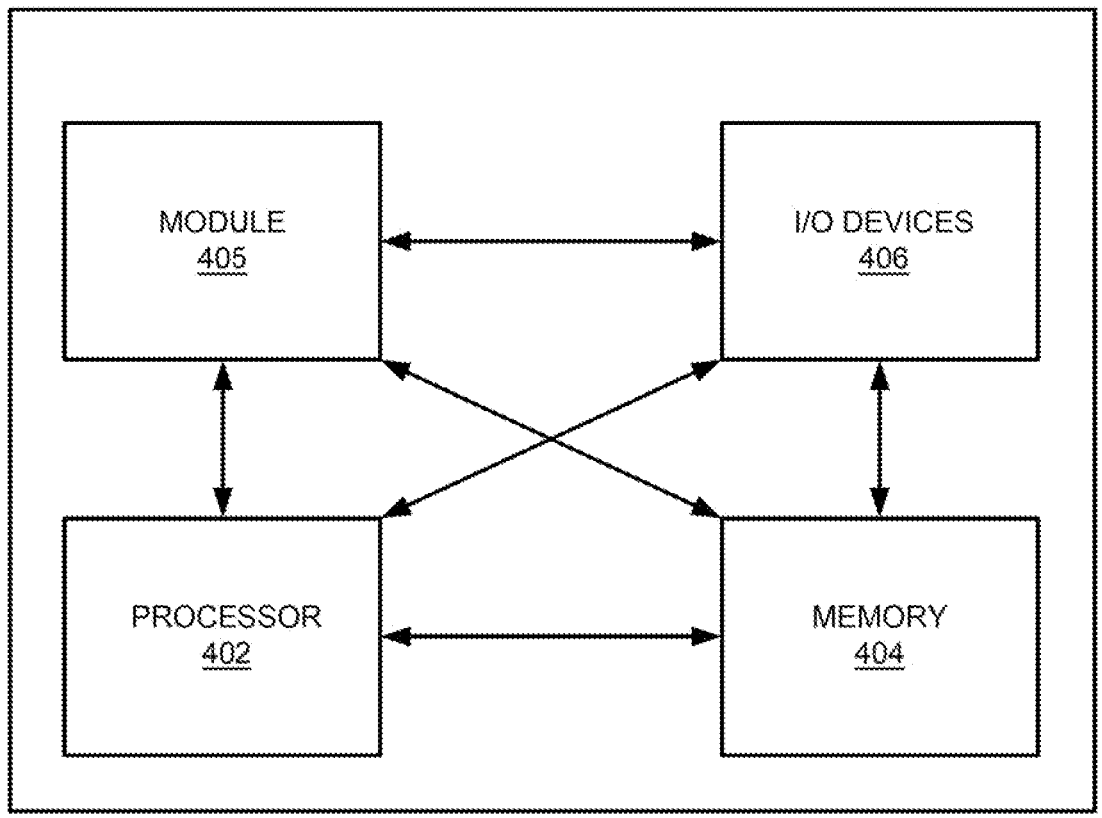
FIG. 4 depicts a high-level block diagram of a computing device or processing system specifically programmed to perform the functions described herein.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for controlling an autonomous vehicle, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, transceivers, power units, and so forth. Although only one processor element is shown, it should be noted that the computing device may employ a plurality of processor elements. Furthermore, although only one computing device is shown in the figure, if the method 200 or 300 as discussed above is implemented in a distributed or parallel manner for a particular illustrative example, i.e., the steps of the above method 200 or 300, or the entire method 200 or 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 or 300. In one example, instructions and data for the present module or process 405 for controlling an autonomous vehicle (e.g., a software program comprising computer-executable instructions) can be loaded into memory 404 and executed by hardware processor element 402 to implement the steps, functions, or operations as discussed above in connection with the illustrative method 200 or 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for controlling an autonomous vehicle (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method, comprising:
controlling, by a processing system of an autonomous vehicle, a sonar system of the autonomous vehicle to emit a plurality of sonar beams into an environment surrounding the autonomous vehicle;
detecting, by the processing system, a change in conditions in the environment; and
adjusting, by the processing system in response to the change in conditions, at least one of: a temporal parameter of the plurality of sonar beams or a spectral parameter of the plurality of sonar beams, wherein the spectral parameter comprises a spectral frequency of the plurality of sonar beams, and wherein the adjusting of the spectral parameter comprises: changing the spectral frequency from a constant frequency to a modulated frequency, or changing the spectral frequency from a modulated frequency to a constant frequency.

2. The method of claim 1, wherein the temporal parameter comprises a sampling rate of the plurality of sonar beams.

3. The method of claim 2, wherein the sampling rate comprises a number of the plurality of sonar beams that is emitted by the sonar system within a fixed window of time.

4. The method of claim 3, wherein the adjusting further comprises:
   increasing, by the processing system, the sampling rate when the change in conditions comprises an increase in a density of objects in the environment; or
   decreasing, by the processing system, the sampling rate when the change in conditions comprises a decrease in a density of objects in the environment.

5. The method of claim 1, wherein the autonomous vehicle is an automobile.

6. The method of claim 1, wherein the autonomous vehicle is a drone.

7. A method, comprising:
   controlling, by a processing system of an autonomous vehicle, a sonar system of the autonomous vehicle to emit a plurality of sonar beams into an environment surrounding the autonomous vehicle;
   detecting, by the processing system, a change in an internal condition of the autonomous vehicle; and
   adjusting, by the processing system in response to the change in the internal condition, at least one of: a temporal parameter of the plurality of sonar beams or a spectral parameter of the plurality of sonar beams, wherein the spectral parameter comprises a spectral frequency of the plurality of sonar beams, and wherein the adjusting of the spectral parameter comprises: changing the spectral frequency from a constant frequency to a modulated frequency, or changing the spectral frequency from a modulated frequency to a constant frequency.

8. The method of claim 7, wherein the temporal parameter comprises a sampling rate of the plurality of sonar beams.

9. The method of claim 8, wherein the sampling rate comprises a number of the plurality of sonar beams that is emitted by the sonar system within a fixed window of time.

10. The method of claim 9, wherein the internal condition comprises a status of a computing resource of the autonomous vehicle, and the adjusting further comprises:
    increasing, by the processing system, the sampling rate when the change in the internal conditions comprises a decrease in a consumption of the computing resource; or
    decreasing, by the processing system, the sampling rate when the change in the internal condition comprises an increase in the consumption of the computing resource.

11. The method of claim 7, wherein the autonomous vehicle is an automobile.

12. The method of claim 7, wherein the autonomous vehicle is a drone.

13. The method of claim 7, wherein the internal condition comprises at least one of: a status of a computing resource of the autonomous vehicle or a status of an operating parameter of the autonomous vehicle.

14. A non-transitory computer-readable medium storing instructions which, when executed by a processing system of an autonomous vehicle, cause the processing system to perform operations, the operations comprising:
    controlling a sonar system of the autonomous vehicle to emit a plurality of sonar beams into an environment surrounding the autonomous vehicle;
    detecting a change in at least one of: conditions in the environment or an operating parameter of the autonomous vehicle; and
    adjusting, in response to the change, at least one of: a temporal parameter of the plurality of sonar beams or a spectral parameter of the plurality of sonar beams, wherein the spectral parameter comprises a spectral frequency of the plurality of sonar beams, and wherein the adjusting of the spectral parameter comprises: changing the spectral frequency from a constant frequency to a modulated frequency, or changing the spectral frequency from a modulated frequency to a constant frequency.

15. The non-transitory computer-readable medium of claim 14, wherein the temporal parameter comprises a sampling rate of the plurality of sonar beams.

16. The non-transitory computer-readable medium of claim 15, wherein the sampling rate comprises a number of the plurality of sonar beams that is emitted by the sonar system within a fixed window of time.

17. The non-transitory computer-readable medium of claim 16, wherein the adjusting further comprises:
    increasing, by the processing system, the sampling rate when the change in conditions comprises an increase in a density of objects in the environment; or
    decreasing, by the processing system, the sampling rate when the change in conditions comprises a decrease in a density of objects in the environment.

18. The non-transitory computer-readable medium of claim 14, wherein the autonomous vehicle is an automobile.

19. The non-transitory computer-readable medium of claim 14, wherein the autonomous vehicle is a drone.

\* \* \* \* \*